United States Patent Office 3,228,888
Patented Jan. 11, 1966

3,228,888
METHOD OF STABILIZATION WITH SUBSTITUTED THIAZOLE STABILIZERS AND STABILIZED COMPOSITIONS THEREOF
John D. Spivack, Spring Valley, and Martin Dexter, Briarcliff Manor, N.Y., assignors to Geigy Chemical Corporation, Greenburg, N.Y., a corporation of Delaware
No Drawing. Original application May 13, 1960, Ser. No. 28,839. Divided and this application Nov. 23, 1962, Ser. No. 239,783
7 Claims. (Cl. 252—402)

This application is a division of U.S. patent application Serial Number 28,839, filed May 13, 1960, now abandoned.

This invention relates to a method of stabilization with substituted thiazole stabilizers and compositions thereof with organic material normally subject to deterioration, e.g., oxidative.

In one aspect of the invention, organic material normally subject to oxidative deterioration is stabilized by compounds of the formula:

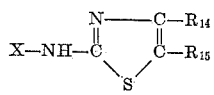

(I)

wherein $R_{14}$ represents methyl,
$R_{15}$ represents hydrogen,
X represents phenyl, methoxyphenyl, ethoxyphenyl, hydroxyphenyl, naphthyl, acenaphthyl, and thiazolyl of the formula:

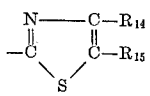

wherein $R_{14}$ and $R_{15}$ are as defined above, and $R_{14}$ and $R_{15}$ taken jointly represent —CH=CH—CH=CH—, which forms the fused benzene nucleus with the thiazole ring.

In another embodiment, organic material normally subject to oxidative deterioration is stabilized by compounds of the formula:

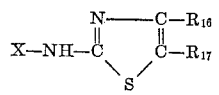

(II)

wherein $R_{16}$ represents phenyl,
$R_{17}$ represents hydrogen,
$R_{16}$ and $R_{17}$ taken jointly represent

—CH=CH—CH=CH— which forms the fused benzene nucleus with the thiazole ring,
X represents phenyl, methoxyphenyl, ethoxyphenyl, naphthyl, acenaphthyl, and thiazolyl of the formula:

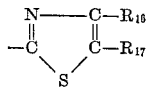

wherein $R_{16}$ and $R_{17}$ are as defined above.

Accordingly, it is an object of the invention to provide a stable composition which comprises an effective amount of a stabilizer of the Formula I or II, and organic material, normally subject to oxidative deterioration, as hereinafter defined and illustrated.

It is a further object of the invention to provide a method of stabilizing said organic material which is normally subject to oxidative deterioration, which comprises incorporating therein a stabilizing amount of a compound of the Formula I or II.

The utility of this embodiment of the invention is seen by the advantageous stabilization of organic material whose useful properties are lost or impaired by deterioration, e.g., by the oxidative action of the atmosphere and/or exposure to light and/or heat. Organic material as defined hereinabove may be usefully protected by the stabilizers of type I and II of the invention alone, or in combination with another additive, e.g., an antioxidant, corrosion inhibitor, pour-point depressant, etc. The utility of this aspect of the invention will be further seen from the additional examples and discussion which follows.

In this specification, the term "lower alkyl" signifies an alkyl group having from 1 to 6 carbon atoms, and the expression "-t-" signifies "-tertiary-."

Up to the present time, the use of the foregoing classes of substituted thiazoles in stabilizing organic material, e.g., polypropylene, has not been known. It has now surprisingly been found that many organic materials are stabilized against deterioration, e.g., oxidative and/or light induced and/or thermal deterioration, by incorporating therein a stabilizing quantity of a substituted thiazole according to the present invention.

Accordingly, it is a prime object of the invention to provide stable organic material, e.g., polymeric material. In this specification it is understood that polymeric material includes polyolefins, rubber, etc. Preferably, the polyolefins are of high molecular weight, e.g., above 1000 into the hundreds of thousands range. Specifically, polyethylenes, polypropylenes, polybutylenes, and polymers of higher molecular weight olefins are contemplated. Such polymers may be of high density, medium density, or low density class. These polymers, e.g., polyethylene, and polypropylene, find use as thermoplastic molding or coating agents. Moreover, because of their high dielectric strength and their resistance to water, they are particularly useful as insulators or dielectrics in condensers and other such equipment. It is known that these polyolefins, e.g., polyethylene and polypropylene, are attacked by oxygen, particularly when exposed to the atmosphere and at elevated temperatures. For example, during use or manufacture the desirable properties of the polyolefin may be impaired due to oxidative degradation. Such degradation causes loss in dielectric properties, discoloration, embrittlement, gellation, etc. Degradation may be also caused or aggravated by exposure to light and/or heat.

Polyhaloolefins, such as polyvinylchloride and polyamide material, such as nylon, are also within the scope of this invention.

Not only homopolymeric material, but also copolymers and physical mixtures thereof are stabilized according to the present invention. For example, high impact polystyrene containing copolymers of butadiene and styrene are stabilized by the compounds of the invention. Synthetic rubber, including styrene-butadiene (SBR) rubber, is stabilized. Other examples of rubber stabilized according to the invention include polyisoprene rubber, butyl rubber, nitrile rubber, neoprene rubber and natural rubber. In fact, any rubber subject to degradation, e.g., by atmospheric oxygen, is within the scope of the present invention.

The invention is also particularly useful in stabilizing lubricating oils of various types including aliphatic esters, polyalkylene oxides, silicones, esters of phosphoric and silicic acids, highly fluorine-substituted hydrocarbons, etc. Specially, such aliphatic esters which are usefully stabilized comprise dihexyl azelate, di(2-ethylhexyl) acelate, di-(3,5,5-trimethylhexyl) glutarate, di - (3,5,5 - trimethylpentyl) glutarate, di-(2-ethylhexyl) pimelate, di-(2-ethylhexyl) adipate, diisoamyladipate, triamyl tricarballylate, pentaerythritol tetracaproate, dipropylene glycol dipelargonate, 1,5-pentanediol-di-(2-ethylhexanoate) etc. Other specific lubricants include polyisopropylene oxide, polyisoproylene oxide diether, polyisopropylene oxide diester, etc., as well as methyl silicone, methylphenyl silicone, tetraisooctyl silicate, etc., and fluorinated oil, e.g., perfluorohydrocarbons.

The stabilizers of the present invention are also useful in stabilizing fatty materials including oils of animal and vegetable origin which tend to deteriorate, e.g. on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cottonseed oil, butter, fat, lard, beef tallow, etc. Other oils and fats which deteriorate on standing and exposure to oxygen in the air, or on being subjected to treatment such as contacting with air or oxygen at elevated temperatures, are all within the scope of the present invention.

Within the scope of the invention, also, are saturated and unsaturated hydrocarbons which tend to deteriorate on storage, such as for example, gasolines, both natural and synthetic, in particular, saturated and unsaturated gasolines, etc., jet fuel, diesel oil, mineral oil, fuel oil, drying oil, waves, resins, etc. Such hydrocarbons are protected against gum formation, discoloration and other deterioration with the stabilizers of the present invention.

It is an object of the invention, therefore, to provide a method for stabilizing organic material normally subject to oxidative deterioration by incorporating in said organic material a stabilizing amount of a thiazole stabilizer according to the invention hereinbefore defined.

The specific stabilizer most useful for a given unstable material will depend upon several factors for its advantages. Availability and cost of raw materials for the manufacture of the stabilizer and effective inhibitory action of the stabilizer, including duration and degree of activity, are among the factors which control the choice of a specific stabilizer for a specific substrate which is normally subject to oxidative deterioration. Toxicity, color, stability to light and solubility are also important factors.

In general, the stabilizers of the invention are employed in a concentration of from about 0.001% to about 5% by weight, preferably from about 0.01% to about 1% by weight, based on the total weight of the stabilized material. The specific concentration used varies with the substrate and the stabilizer, but the following generalizations can be made.

Concentrations of about 0.001% to about 0.1% by weight of the antioxidant in polyethylene are useful. In polypropylene, from about 0.05% to about 1% by weight of the stabilizer are used. For polystyrene, from about 0.1% to about 1% by weight is useful. In rubber, concentrations of from about 0.05% to about 1% are useful. In mineral oils, concentrations of from about 0.005% to about 1% by weight of stabilizer are used. Gasolines are stabilized with from about 0.01% to about 0.1% by weight of stabilizer, preferably 0.05% by weight. Fatty material of animal origin, such as lard, is stabilized with from about 0.001% to about 0.1% by weight of stabilizer. Oils of vegetable origin, such as cotton seed oil, are stabilizer with from about 0.001% to about 0.01% by weight of stabilizer.

Hydrocarbon material, such as cycloolefins, e.g., cyclohexene, is advantageously stabilized with from about 0.001% to about 1% by weight of the stabilizers of the present invention. The same concentrations of stabilizer are used to stabilizer aldehydes, such as for example, about 0.01% by weight of stabilizer in heptaldehyde. High temperature lubricants which are essential diesters, e.g., diisoamyladipate, are stabilized with from about 0.5% to about 5%, preferably about 2% by weight of a stabilizer according to the invention.

The compounds of this invention may be also used to stabilize organic material in combination with other additive agents, such as for example, antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, UV absorbers, dyes and pigments, etc.

Several routes may be followed to the synthesis of the substituted benzothiazoles which are useful as stabilizers according to the invention.

Thus, the benzothiazoles are prepared according to the methods outlined in steps (a)–(d) set forth in the reaction scheme below. For example, in step (a) an arylamine is reacted with carbon disulfide and optionally with equimolar quantities of sulfur. The product thiazole is treated with sulfuryl chloride and the resultant halogen compound is reacted with an arylamine to produce the desired compound.

In steps (b) a diarylthiourea is rearranged to form the desired thiazole, while in step (c) an aminothiazole is modified with sodium nitrite and hydrohalic acid to produce a halogen compound which in turn is reacted with an arylamine as in step (a).

In step (d) a diarylamine and thiocyanogen are brought into reaction to produce a thiocyanate which is rearranged to yield the desired arylaminothiazole.

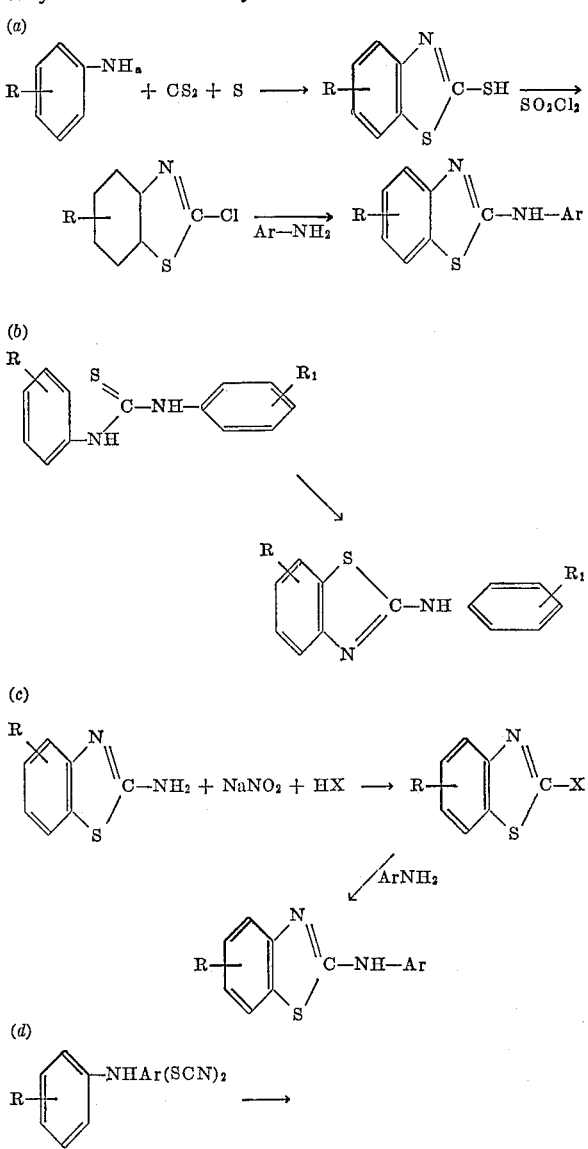

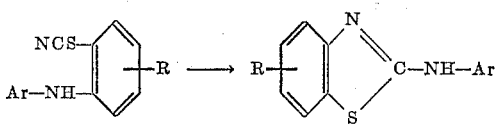

In the foregoing reaction sequences, (a–d) naphthylamines may be employed as well as phenylamines to yield both 2-(phenylamino)-benzothiazoles and 2-naphthylamino)-benzothiazoles. Thus, in the foregoing sequences (a) to (d), Ar represents aryl, such as phenyl, substituted phenyl, naphthyl, substituted naphthyl, etc. and X represents halogen, e.g., chlorine.

It will be apparent from the examples also that the compounds of the invention are useful in stabilizing a wide variety of organic materials normally subject to oxidative deterioration. However, it is not intended to limit the scope of the compositions nor of the methods merely to the specific compositions and methods illustrated by the examples.

In the examples, temperature is in degrees centigrade and parts are by weight unless otherwise noted. The relationship of parts by wight to parts by volume is as that of grams to cubic centimeters.

EXAMPLES

The following specific compounds of the invention are useful in stabilizing organic material according to the invention:

| Compound: | M.P., ° C. |
|---|---|
| 2-(α-naphthylamino)-4-phenylthiazole | 168 |
| 2-(β-naphthylamino)-4-phenylthiazole | 125–127 |
| 2-(p-methoxyanilino)-4-phenylthiazole | 163 |
| 2-anilino-4-phenylthiazole | 137 |
| 2-(5-acenaphthylamino)-4-phenylthiazole | 149–151 |
| 2,2'-imino-bis-(4-methylthiazole) | 146–147 |
| 2,2-imino-bis(4-phenylthiazole) | 218–219 |
| 2-(p-methoxyanilino)-4-methylthiazole | 106–107 |
| 2-(o-methoxyanilino)-4-methylthiazole | 72–74 |
| 2-(o-hydroxyanilino)-4-methylthiazole | 152–153 |
| 2-(p-hydroxyanilino)-4-methylthiazole | 222 |
| 2-(α-naphthylamino)-4-methylthiazole | 148–150 |
| 2-(m-hydroxyanilino)-4-methylthiazole | 152–153 |
| 2-(p-hydroxyanilino)-4-methylthiazole | 256 |
| 2-anilinobenzothiazole | 160–162 |
| 2-(o-hydroxyanilino)-benzothiazole | 177 |
| 2-(o-methoxyanilino)-benzothiazole | 151–153 |
| 2-(p-aminoanilino)-benzothiazole | 146–147 |
| 2-(4-amino-3,6-diethoxyphenylamino)-benzothiazole | 157–159 |
| 2-α-naphthylaminobenzothiazole | 190–192 |

The preparation of the compounds of the Formulae I and II is carried out according to methods described and illustrated hereinabove.

The following additional examples further illustrate the invention, the parts, proportions and temperatures being as hereinbefore defined.

Example 1

Unstabilized polyproplylene powder (Hercules Profax 6501) is thoroughly blended with 0.5% by weight of 2,2'-imino-bis-(4-phenylthiazole). The blended material is then milled on a two roller mill at 182° for 10 minutes, after which time the stabilized polypropylene is sheeted from the mill and allowed to cool.

The milled polypropylene sheet is then cut into small pieces and pressed for 7 minute on a hydraulic press at 218° and 2000 pounds per square inch pressure. The resultant sheet of 25 mil thickness is tested for resistance to accelerated aging in a forced draft oven at 149°. As is evident from the table below, the composition of 0.5% by weight of 2,2'-imino-bis-(4-phenylthiazole) and polypropylene is stabilized against oxidative deterioration.

STABILIZATION OF POLYPROPYLENE AGAINST OVEN AGING AT 149–CRAZING [1] TIME

| | Hours |
|---|---|
| Polypropylene alone | 3 |
| Polypropylene+stabilizer [2] | 85 |

[1] Crazing is the surface embrittlement (fine cracks on surface) which is an indication of oxidative deterioration.
[2] 2,2'-imino-bis-(4-phenylthiazole).

In like manner, analogous to the foregoing Example 1, stable compositions of polypropylene are prepared having 0.05–1% by weight of the following compounds:

2-(α-naphthylamino)-4-phenylthiazole
2-(β-naphthylamino)-4-phenylthiazole
2-(p-methoxyanilino)-4-phenylthiazole
2-anilino-4-phenylthiazole
2-(5-acenaphthylamino)-4-phenylthiazole
2,2'-imino-bis-(4-methylthiazole)
2,2'-imino-bis-(4-phenylthiazole)
2-(p-methoxyanilino)-4-methylthiazole
2-(o-methoxyanilino)-4-methylthiazole
2-(p-hydroxyanilino)-4-methylthiazole
2-(o-hydroxyanilino)-4-methylthiazole
2-(α-naphthylamino)-4-methylthiazole
2-(m-hydroxyanilino)-4-methylthiazole
2-(p-hydroxyanilino)-4-methylthiazole
2-anilinobenzothiazole
2-(o-hydroxyanilino)-benzothiazole
2-(o-methoxyanilino)-benzothiazole
2-(p-aminoanilino)-benzothiazole
2-(4-amino-3,6-diethoxyphenylamino)-benzothiazole
2-α-naphthylaminobenzothiazole If the foregoing compounds, according to Example 1, are each separately incorporated into low-pressure polyethylene by milling at 120° in an amount of 0.1% by weight, then the resultant compositions are stabilized against deterioration. For example, 2 - (α - naphthylamino)-4-methylthiazole stabilizes polyethylene.

If the foregoing compounds according to Example 1 are each separately incorporated into high impact polystyrene (Foster Grant Tuflex X11516) by milling at 155° in an amount of 0.1% by weight, then the resultant compositions are stabilized against deterioration.

If the foregoing compounds, according to Example 1, are incorporated into diisoamyladipate in an amount of about 2% by weight, then a stable composition is obtained. Tetralin is also so stabilized.

Example 2

A stabilized mineral oil composition is prepared by incorporating into a refined mineral oil of 183 S.U.S. at 100° F. (Regal Oil B, Texas Company) 0.005% by weight of 2,2'-imino-bis-(4-methylthiazole). The stability of said composition is tested by incorporating therein 20 parts per million of copper as the naphthenate and placing the resultant mixture in a modified Sligh oxidation flask equipped with a mercury manometer (Davis et al., Ind. Eng. Chem., vol. 33, p. 339, March 1941). The flask is then placed in a constant temperature oil bath at 115°. The length of time for a pressure drop of 60 mm. from the maximum pressure noted is taken as the time of failure. The stabilized mineral oil does not fail after 68 hours, the blank failing after 3½ hours.

In like manner, mineral oil (Regal Oil B) is stabilized with 0.05% by weight of 2-(o-hydroxyanilino)-benzothiazole.

The following stabilizers are each effective stabilizers of mineral oil:

2-(α-naphthylamino)-4-phenylthiazole
2-(m-hydroxyanilino)-4-methylthiazole
2-(α-naphthylamino)-4-methylthiazole

Example 3

Stabilized gasoline is prepared by incorporating into gasoline having no additives and no stabilizers therein, 0.05% by weight of 2-(o - hydroxyanilino) - 4 - methylthiazole. The gasoline, with and without stabilizer, is tested by the oxygen bomb induction period method (ASTM D525–55), with the result that the gasoline with stabilizer does not fail after 425 minutes, while the blank fails after 250 minutes.

*Example 4*

Stabilized lard is prepared by incorporating in lard (Tobin Packing Company) 0.01% by weight of 2-(α-naphthylamino)-4-phenylthiazole. The lard, with and without stabilizer, is teseted by the oxygen induction period method (ASTM D525–55) with the following changes: 15 parts of lard sample are tested; the end point is defined as the mid-point of the first hour in which a pressure drop of 2 lbs. per square inch or greater is noted, followed by an equivalent or greater drop in the succeeding hour. The stabilized lard fails after 360 minutes, while the unstabilized lard fails after 108 minutes.

Stabilized cotton seed oil is prepared when 0.01% by weight of the stabilizer of Example 4 is incorporated therein, the unstabilized oil being a refined edible cotton seed oil (Welch, Holme and Clark). After 410 minutes, the stabilized cotton seed oil does not fail in the test of Example 4, while the unstabilized oil fails after 282 minutes.

*Example 5*

Heptaldehyde is stabilized by incorporating into the freshly distilled aldehyde 0.01% by weight of the stabilizer of Example 4.

*Example 6*

Cyclohexene, freshly distilled, is stabilized by the addition thereto of 0.001% by weight of 2-(o-hydroxyanilino)-4-methylthiazole. The effectiveness of this stabilizer in cyclohexene is tested by the ASTM D525–55 oxidation test with the modification that only 10 parts by volume of cyclohexene are used in each bomb. The stabilized cyclohexene runs more than 90 minutes without failure, while unstabilized cyclohexene fails after only 30 minutes.

*Example 7*

Paraffin wax (M.P. 125–128° F.) is stabilized by incorporating therein 0.001% by weight of the stabilizer of Example 4. The effective stabilization thereby is illustrated by the following test. The paraffin wax with stabilizer is heated for 18 hours at 121° in the presence of air. Unstabilized wax is also heated in like manner. After 18 hours there is no perceptible odor for the stablized wax. The unstabilized wax, however, exhibits a distinct odor.

*Example 8*

Stabilized rubber was prepared by mixing in the cold:

| | Parts |
|---|---|
| Hevea latex crepe | 100.0 |
| Stearic acid | 1.5 |
| Zinc oxide | 5.0 |
| Diphenylguanidine | 1.0 |
| Sulfur | 2.5 |
| 2-(α-naphthylamino)-4-methylthiazole | 1.0 |

The resultant mixture is vulcanized at 140° and tested according to ASTM D—1206-52T. The time required to elongate a test strip from 120 mm. to 170 mm. is 8½ hours for the unstabilized rubber and 15 hours for the stabilized rubber. In like manner, polyisoprene rubber and styrenebutadiene rubber are stabilized.

It is understood that in the foregoing Examples 1–8 inclusive, compositions which comprise the oxidizable material of each of said Examples 1–8 are stabilized by amounts of 0.005–1% by weight of each of the following:

2-(α-napthylamino)-4-phenylthiazole
2-(β-naphthylamino)-4-phenylthiazole
2-(p-methoxyanilino)-4-phenylthiazole
2-anilino-4-phenylthiazole
2-(5-acenaphthylamino)-4-phenylthiazole
2,2'-imino-bis-(4-methylthiazole)
2,2'-imino-bis-(4-phenylthiazole)
2-(p-methoxyanilino)-4-methylthiazole
2-(o-methoxyanilino)-4-methylthiazole
2-(o-hydroxyanilino)-4-methylthiazole
2-(p-hydroxyanilino)-4-methylthiazole
2-(α-naphthylamino)-4-methylthiazole
2-(m-hydroxyanilino)-4-methylthiazole
2-(p-hydroxyanilino)-4-methylthiazole
2-anilinobenzothiazole
2-(o-hydroxyanilino)-benzothiazole
2-(o-methoxyanilino)-benzothiazole
2-(p-aminoanilino)-benzothiazole
2-(4-amino-3,6-diethoxyphenylamino)-benzothiazole
2-α-naphthylaminobenzothiazole

What is claimed is:

1. The method of stabilizing organic matter normally subject to oxidative deterioration and selected from the group consisting of polypropylene, polyethylene, polystyrene, natural rubber, synthetic rubber, mineral lubricating oil, animal oil, vegetable oil, gasoline, synthetic ester lubricants, aldheydes, cycloolefins and paraffin wax, which comprises incorporating therein a stabilizing amount of a compound of the formula:

$$X-NH-\underset{\underset{S}{\diagdown\diagup}}{C}\overset{N-\!\!\!-\!\!\!-C-R}{\underset{CH}{\|}}$$

wherein

R is selected from the group consisting of methyl and phenyl and
X is selected from the group consisting of methoxyphenyl, ethoxyphenyl, hydroxyphenyl, aminophenyl, naphthyl, acenaphthyl, and thiazolyl of the formula:

$$-\underset{\underset{S}{\diagdown\diagup}}{C}\overset{N-\!\!\!-\!\!\!-C-R}{\underset{CH}{\|}}$$

wherein

R is as defined above.

2. A composition of matter consisting of a member selected from the group consistnig of polypropylene, polyethylene, polystyrene, natural rubber, synthetic rubber, mineral lubricating oil, animal oil, vegetable oil, gasoline, synthetic ester lubricants, aldehydes, cycloolefins and paraffin wax and a stabilizing amount of a compound of the formula:

$$X-NH-\underset{\underset{S}{\diagdown\diagup}}{C}\overset{N-\!\!\!-\!\!\!-C-R}{\underset{CH}{\|}}$$

wherein

R is selected from the group consisting of methyl and phenyl and
X is selected from the group consisting of methoxyphenyl, ethoxyphenyl, hydroxyphenyl, aminophenyl, naphthyl, acenaphthyl and thiazolyl of the formula:

$$-\underset{\underset{S}{\diagdown\diagup}}{C}\overset{N-\!\!\!-\!\!\!-C-R}{\underset{CH}{\|}}$$

wherein

R is as defined above.

3. A composition of matter as in claim 2 wherein the stabilizing compound 2-(o-hydroxyanilino) - 4 - methylthiazole.

4. A composition of matter as in claim 2 wherein the stabilizing compound is 2-(p-methoxyanilino) - 4 - methylthiazole.

5. A composition of matter as in claim 2 wherein the stabilizing compound is 2-($\alpha$-naphthylamino) - 4 - methylthiazole.

6. A composition of matter as in claim 2 wherein the stabilizing compound is 2-($\alpha$-naphthylamino)-4-phenylthiazole.

7. A composition of matter as in claim 2 wherein the stabilizing compound is 2-(p-aminoanilino) - 4 - phenylthiazole.

References Cited by the Examiner
UNITED STATES PATENTS

| | | | |
|---|---|---|---|
| 2,154,096 | 4/1939 | Loane | 252—47 |
| 2,316,011 | 4/1943 | Miller et al. | 44—63 |
| 3,010,912 | 11/1961 | Hardman | 252—402 |

JULIUS GREENWOLD, *Primary Examiner.*